UNITED STATES PATENT OFFICE.

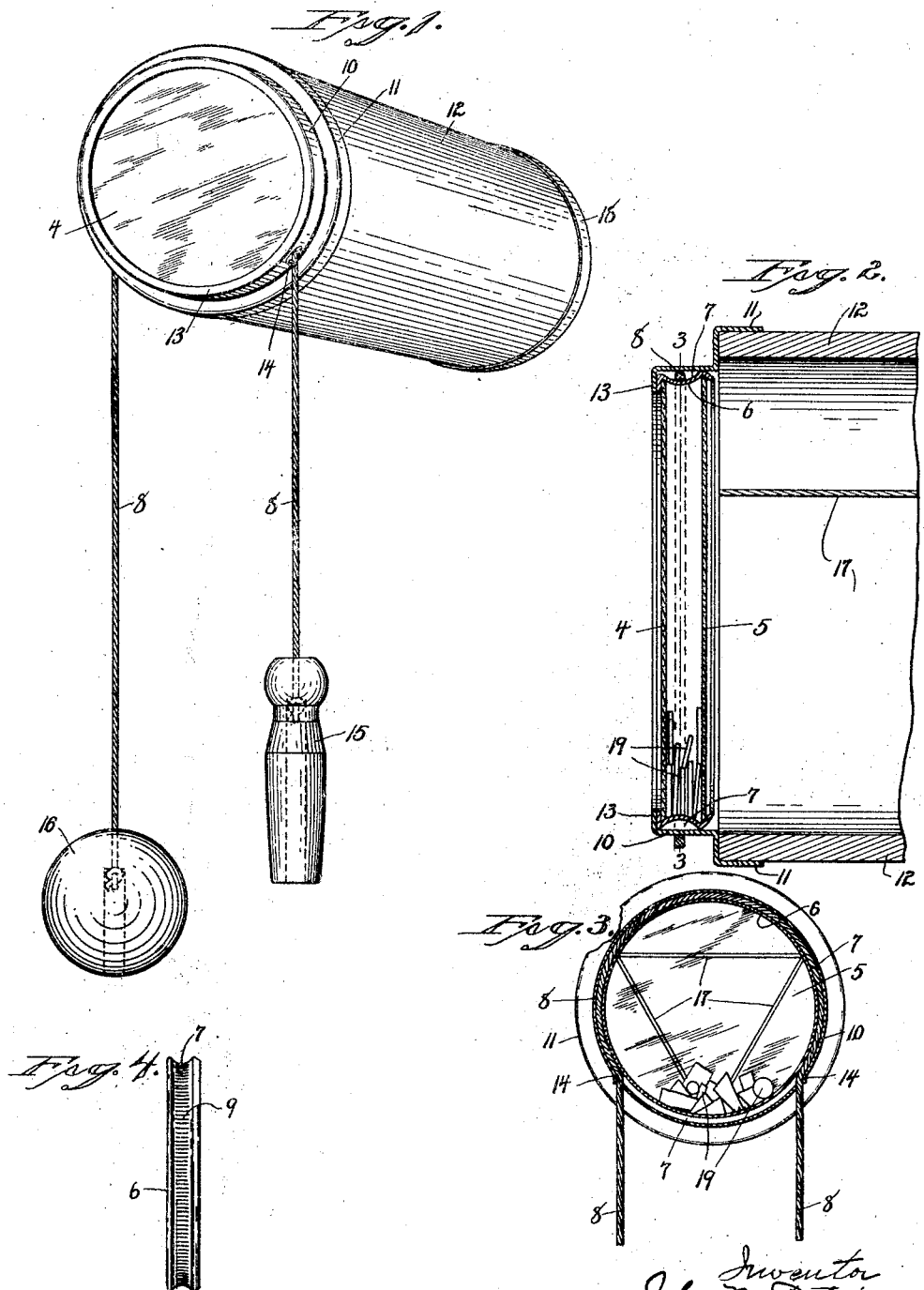

JOHN W. PETRIE, OF NEW HAVEN, CONNECTICUT.

KALEIDOSCOPE.

1,383,019.  Specification of Letters Patent.  Patented June 28, 1921.

Application filed November 4, 1920. Serial No. 421,673.

*To all whom it may concern:*

Be it known that I, JOHN W. PETRIE, a citizen of the United States, residing at New Haven, in the county of New Haven and State of Connecticut, have invented a new and useful Improvement in Kaleidoscopes; and I do hereby declare the following, when taken in connection with the accompanying drawings and the characters of reference marked thereon, to be a full, clear, and exact description of the same, and which said drawings constitute part of this application, and represent, in—

Figure 1, a perspective view of a kaleidoscope embodying my invention;

Fig. 2, an enlarged broken view in vertical longitudinal section of the front end thereof;

Fig. 3, a view in transverse section on the line 3—3 of Fig. 2;

Fig. 4, a detached edge view of the object-box.

My invention relates to an improvement in kaleidoscopes, the object being to provide at a reduced cost for manufacture, a simple and durable kaleidoscope constructed with particular reference to protecting its object-box against injury in the transportation of the article, as well as against rough handling in use and to convenience of operation.

With these ends in view my invention consists in a kaleidoscope having certain details of construction and combination of parts as will be hereafter described and pointed out in the claims.

In carrying out my invention as herein shown, I employ a shallow circular object-box comprising circular front and rear plates 4 and 5 of glass or celluloid, the outer plate 4 being ground, if glass, or, if celluloid, treated to have the effect of ground glass. These disks are mounted so as to be spaced apart, in a metal ring 6 having its edges turned inward and formed with a peripheral groove 7 for the reception of an operating-cord 8 which is prevented from slipping in the groove 6 by nurling the bottom thereof as at 9, or by treating the bottom of the groove in some equivalent manner, whereby enough friction between the box and the cord is secured to insure the turning of the box in one direction or the other when the one end or the other of the cord is drawn downward. The said box is located within a forwardly-projecting annular housing 10 formed at the forward end of and concentric with the front cap 11 of the tube 12 of the kaleidoscope, the forward end of the housing 10 being turned inward to form a retaining-flange 13 which holds the box against outward displacement. The housing 10 aforesaid is formed at opposite points below its horizontal center with openings 14 for the passage through it of the ends of the cord 8, these openings being located in the plane of the circumferential groove in the box. One end of the cord is furnished with a circular handle 15 while its opposite end is provided, as shown, with a spherical counter-weight 16, made sufficiently heavy to reversely rotate the box when the handle 15 is lifted so that the box may be rotated in both directions without removing the hand from the handle. The box is kept from inward displacement by means of the forward ends of the three mirrors 17, which may be made of silvered glass or polished metal, these mirrors extending throughout the length of the tube. The inner end of the tube is furnished with an annular rear cap 18 furnished with the customary eyepiece which is not shown. The object-box contains an assortment of transparent bits 19 of varied shapes and colors. As thus constructed the object-box of my improved kaleidoscope is so inclosed within its housing that it is protected during the transportation of the article or during any rough handling thereof in use. Thus if the kaleidoscope should be dropped, the object-box, on account of being housed, will be protected against injury, whereas, in kaleidoscopes of the prior art, the object-boxes, on account of their provision with radial handles for their operation, are very liable to be injured, both in transportation and in use. By the employment of a cord for the operation of the object-box I am enabled to dispense with such handles and, therefore, to house and protect the box to a degree hitherto unknown, it being only necessary that the operating-cord shall pass through openings in the housing. Moreover, a new effect is secured by the use of a cord, since the object-box may be continuously turned in one direction or the other at a variable speed, so as to get an effect allied to the dissolving effects of moving-pictures.

If preferred, the counter-weight 16 may be dispensed with and replaced by a handle like the handle 15, or the weight 16 may be used as a handle, my invention broadly covering the use of a cord applied directly to the object-box of a kaleidoscope for rotating the same within a housing by means of which the box is protected against injury.

I claim:

1. A kaleidoscope having a rotatable object-box, a housing within which the same is inclosed, and a cord applied directly to the said box for turning the same and having its ends extended outward through the said housing.

2. A kaleidoscope having a rotatable object-box formed with a peripheral groove, a housing within which the said box is inclosed, and a cord located in the said groove and having depending ends whereby the box may be rotated in one direction or the other, the ends of the cord passing outward through the said housing.

3. A kaleidoscope having a tube, a combined front cap and housing mounted upon the forward end thereof, an object-box located within the said housing, and a cord applied to the upper portion of the periphery of the box for rotating the same in one direction or the other, the ends of the said cord passing outwardly through the said housing.

4. A kaleidoscope having a rotatable object-box, a housing within which the same is inclosed, a cord applied directly to the box for rotating the same and having its ends extended through the housing, and a handle and a counter-weight applied to the ends of the cord.

5. A kaleidoscope having a tube, mirrors located therein, a front cap applied to the tube and formed with a forwardly-projecting concentric housing smaller than the diameter of the tube, an object-box located within the said housing and free to turn therein in either direction and having a circumferential groove, and a cord partly encircling the box, running in the said groove, and passing outwardly through the said housing, whereby the box is inclosed and protected against injury.

6. A kaleidoscope having a tube, mirrors located therein, a housing applied to the tube, an object-box located within the said housing with freedom to rotate therein in either direction, a cord applied to the periphery of the box for rotating the same, and openings formed in the said housing in the plane of the box and below the horizontal center of the housing for the issuance of the ends of the cord from the housing.

In testimony whereof, I have signed this specification in the presence of two subscribing witnesses.

JOHN W. PETRIE.

Witnesses:
EDWARD WETZEL,
JOHN A. PETRIE.